Jan. 26, 1971   KARL-WERNER KANNGIESSER   3,559,036
DEVICE FOR SHORT-CIRCUIT RECLOSING IN HVDCT MULTIPOINT NETWORKS
Filed Sept. 18, 1968
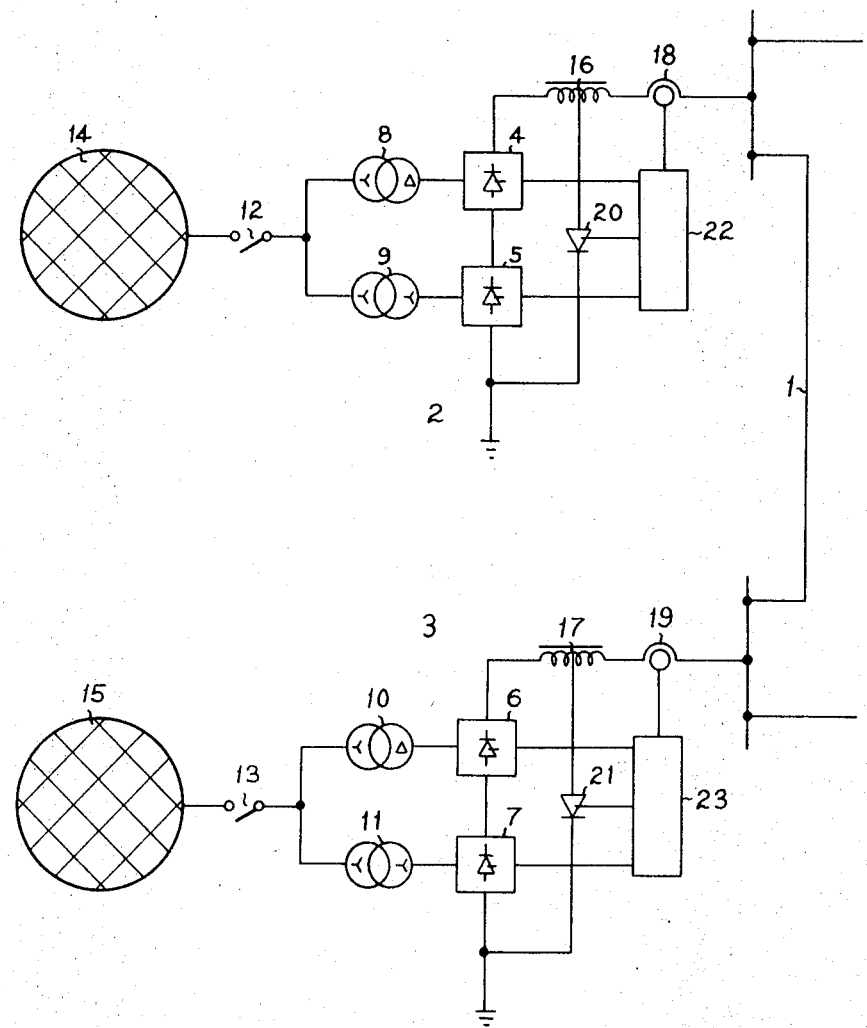
INVENTOR.
Karl-Werner Kanngiesser
BY
Pierce, Schiffler & Parker
Attorneys United States Patent Office
3,559,036
Patented Jan. 26, 1971

3,559,036
DEVICE FOR SHORT-CIRCUIT RECLOSING IN HVDCT MULTIPOINT NETWORKS
Karl-Werner Kanngiesser, Viernheim, Germany, assignor to Aktiengesellschaft Brown, Boveri & Cie., Baden, Switzerland, a joint-stock company
Filed Sept. 18, 1968, Ser. No. 760,458
Claims priority, application Germany, Sept. 26, 1967, P 15 88 079.2
Int. Cl. H02h 7/14; H02j 1/12; H02m 1/18
U.S. Cl. 321—13                                   3 Claims

ABSTRACT OF THE DISCLOSURE

A high voltage, direct current transmission multipoint network including rectifier and inverter stations, there being a controllable short-circuit branch provided in parallel with the rectifier head stations for currents flowing in a direction counter to the flow direction of the operational current.

---

The present invention relates to a device for short-circut reclosing in HVDCT multipoint networks with rectifier and inverter stations.

In high-voltage direct-current transmission (HVDCT) in multipoint operation, several head stations are connected together in parallel for the uptake and transfer of power to the connected three-phase networks via direct current lines. The head stations consist essentially of current converter transformers, current converter bridges, and smoothing chokes. Because of the low overload capacity of the current converter valves, the bridges are especially endangered by short circuits such as they occur, for example, upon arc-backs in mercury vapor valves.

Until now, devices for short-circuit reclosing in HVDCT systems have been used mainly in two-point operation having at both ends of the D.C. transmission line only one head station each. If, in two-point operation, arc-back occurs in one of the current converter bridges connected in series, the grids of the individual controllable valves of the bridges are blocked and a shunt valve lying between the positive and negative poles of the bridges is opened (cf. "Elektrizitätsvirtschaft," No. 21, 1964, p. 740, FIG. 2). After passage through zero voltage, the shunt valve takes over the direct current and the HVDCT operation continues with a D.C. voltage reduced by the bridge component. After a recovery interval the current is commutated back to the bridge valves, so that normal operation can continue.

This method of short-current reclosure upon arc-back can be used analogously also for HVDCT multipoint networks, on the assumption that a regulating method used for two-point connections is applied. Its disadvantage, however, is that upon failure of a bridge the entire line voltage is reduced by the voltage component of the bridge. For this reason it has been proposed for HVDCT multipoint networks, if disturbances occur in one HVDCT station, to preclude this station completely from the power exchange while maintaining the D.C. line voltage unchanged. Now, if in a HVDCT multipoint network operating according to this method, a rectifier station consists of two or several series-connected bridges, the arc-back in one of these bridges brings it about that after a very short time, namely when the energy of the smoothing choke in the exit from the station is exhausted, the full D.C. line voltage is available at the remaining bridges and may lead to further disturbances. The shunt valve cannot protect against such a disturbance, since the line voltage is available in blocking direction, that is, ignition arcing is not possible.

The object of the invention is to render possible short-circuit reclosure upon arc-back in HVDCT multipoint networks whose D.C. voltage remains constant also in case of failure. This is achieved, according to the invention, in that in parallel with each of the rectifier-head stations a controllable short-circuit branch for currents flowing counter to the operational current direction is provided. When the short-circuit branch is closed, a short-circuit path is placed around the series connected rectifier bridges.

For the advantageous execution of the invention it is proposed that there is located in the short-circuit branch a suitable short-circuiting device such as a mechanical quick-action short-circuiting switch, not illustrated, or a controllable current converter valve, as illustrated, which can be closed by a control device in accordance with the arc-back message of the disturbed bridge and of the station current tending toward zero.

For the limitation of the transient overcurrents caused by the short-circuit branch both from the residual bridges of the rectifier station and from the D.C. network, the smoothing choke, existing anyway, is utilized. This is achieved in that one pole of the mechanical quick-action short-circuiting switch, or of the controllable current converter is connected to the tape of a smoothing choke and the other pole is grounded.

An embodiment of the invention is illustrated schematically in the accompanying drawing and will be described in greater detail below.

The HVDCT interlinkage grid 1 is connected with the head stations 2 and 3. The bridges 4, 5 and 6, 7 of these head stations, equipped with shunt valves, are applied via current converter transformers 8, 9 and 10, 11 and power switches 12, 13 to three-phase networks 14, 15. In series with the series-connected bridges 4, 5 and 6, 7, which are grounded by their one D.C. pole, there is a smoothing choke 16, 17 for each, applied via current transformers 18, 19 to the interlinkage grid 1. The smoothing chokes 16, 17 are provided with taps, which are grounded via a controllable current converter 20, 21 for each. From the secondary side of the current transformers 18, 19 a connection goes to the input of the control devices 22, 23 whose outputs are connected to the control electrodes of the controllable current converters 20, 21 and of the controllable rectifiers of the bridges 4, 5 and 6, 7.

If, for example, an arc-back occurs in a current converter vessel of bridge 4 in station 2, the current converter transformer 8 is short-circuited bipolarly. The result is a collapse of the D.C. voltage of bridge 4. In such a case, the current converter vessels of bridge 4 are blocked and the shunt valve belonging to this bridge is ignited, to render possible a correction of the disturbance without release of switch 12. The D.C. voltage of bridge 4 remains zero; the station current is conducted via the shunt valve. The station D.C. voltage is thereby reduced by the amount of the bridge voltage; in the present case it is reduced to one half. The difference ΔU between reduced station voltage and—as assumed—constant line voltage is connected at the smoothing choke 16 and leads to a decrease of the energy stored in the inductor L, the station current $i$ tending toward zero according to the equation $di/dt = \Delta U/L$. A current direction reversal is suppressed by the valve action of the current converter vessels, the station current remains zero, and the smoothing choke can no longer take up any voltage.

With the usual rating of smoothing chokes in HVDCT systems (e.g. Sardinia, Italy system: $L=0.9$ H; $I=1000$ A; $U \rightarrow 200$ kv.) the direct current would drop to zero in less than 10 ms., that is, at a time when the arc-back still exists. The D.C. voltage available from the system would then lead in connection with the transformer voltage of the disturbed bridge 4, to a considerable voltage overload of one of the previously undisturbed converter vessels of this bridge and, if it, too, arcs back, to an overload of the undisturbed bridge 5.

This undesirable phenomenon and its consequent disturbances can be avoided if the current flow via the smoothing choke is maintained intact, so that it can continue to take up the different voltage. This is the purpose which the arrangement of the short-circuit path according to the invention serves.

In the simplest case, this short-circuit path can be connected directly in parallel with the bridges of the current converter station. The disadvantage of this is, however, that upon closing of the short-circuit branch switch, first a surge short-circuit current is released corresponding to the direct (D.C.-side) short-circuit of a current converter system, which must be corrected by the grid blocking of the remaining bridges of this station not affected by the arc-back.

This disadvantage can be avoided in that the short-circuit branch is connected directly between interlinkage grid 1 and ground, because the smoothing choke so limits the current rise upon short-circuit of the remaining bridges of the current converter station that in joint action with the grid control a dangerous over-current is prevented. Instead, there is danger that the capacities of the D.C. network will discharge undamped via the short-circuit path, which likewise—at least in the case of cable networks—may lead to considerable surge short-circuit currents.

The connection of the short-circuit path occurring at a tap of the smoothing choke prevents the described disadvantages and insures a relatively slow and safe current rise.

The additional protective devices provided in the other bridges of the disturbed station and in the other stations thus have sufficient time to reclose the short-circuit definitely. Instead of a controllable current converter as short-circuit switch there may be used a mechanical quick-action short-circuit switch.

Since the current is to be limited and reduced via switch 20 as quickly as possible, the grids of the remaining bridges in the respective station are blocked at the same time as the short-circuit device is actuated.

The advantages obtained with the invention consist in particular in that upon arc-back in a station of a HVDCT multipoint network the danger of consequent disturbances is avoided also when a network regulating method is used in which the D.C. line voltage is maintained constant and the disturbed station is completely excluded from the power exchange.

I claim:

1. In a high-voltage direct current transmission system the combination comprising a multi-phase alternating current network, a high voltage direct current transmission line, at least a pair of head stations connected in parallel between said multi-phase alternating current network and said transmission line, each said head station including a plurality of converter bridges connected electrically in series at their output side of said transmission line and connected in parallel at their input sides through current converter transformers and a power switch to said multi-phase alternating current network, a short-circuit branch connected around said plurality of series-connected converter bridges, a quick-acting short-circuiting device connected in said short-circuit branch, and a control device responsive to current flow at the output side of said series-connected converter bridges in a direction counter to the normal direction of current flow between said bridges and transmission line for actuating said short-circuiting device to close said short-circuit branch around said converter bridges.

2. A high-voltage direct current transmission system as defined in claim 1 which further includes a smoothing choke between said transmission line and the output side of said series connected converter bridges, said smoothing choke including an intermediate tap and wherein one terminal of said short-circuit branch is connected to said intermediate tap on said smoothing choke, the other terminal of said short-circuit branch being grounded at the ground side of said series connected converter bridges.

3. A high-voltage direct current transmission system as defined in claim 2 and which further includes a current transformer having its primary connected in series with said smoothing choke between said transmission line and the output of said series connected converter bridges, the secondary of said current transformer being connected to the input side of said control device and the output side of said control device being connected to said short-circuiting device and also to the control grids of the valves in said converter bridges.

References Cited

UNITED STATES PATENTS

| 2,534,036 | 12/1950 | Lamm | 321—11 |
| 2,899,628 | 8/1959 | Uhlmann | 321—27 |
| 3,439,252 | 4/1969 | Sikes et al. | 321—11 |
| 3,444,453 | 5/1969 | Peterson | 321—11 |

WILLLIAM H. BEHA, Jr., Primary Examiner

U.S. Cl. X.R.

307—82, 86; 321—27